June 3, 1924.
C. M. HALL
VEHICLE LAMP
Filed Feb. 6, 1922
1,496,218
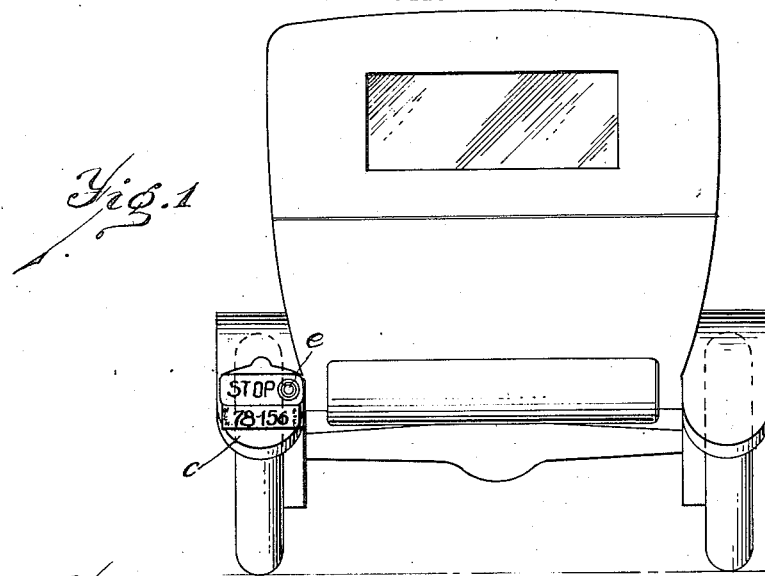
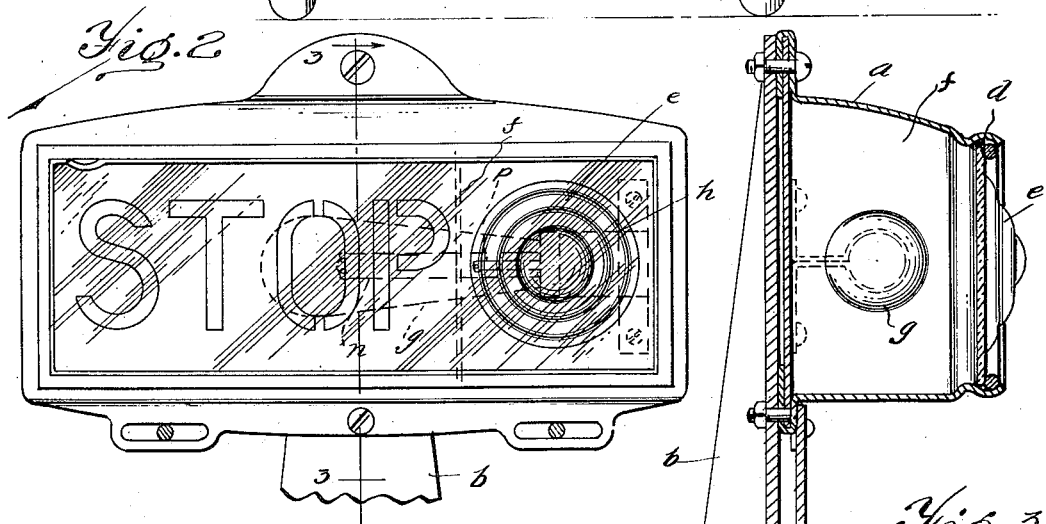
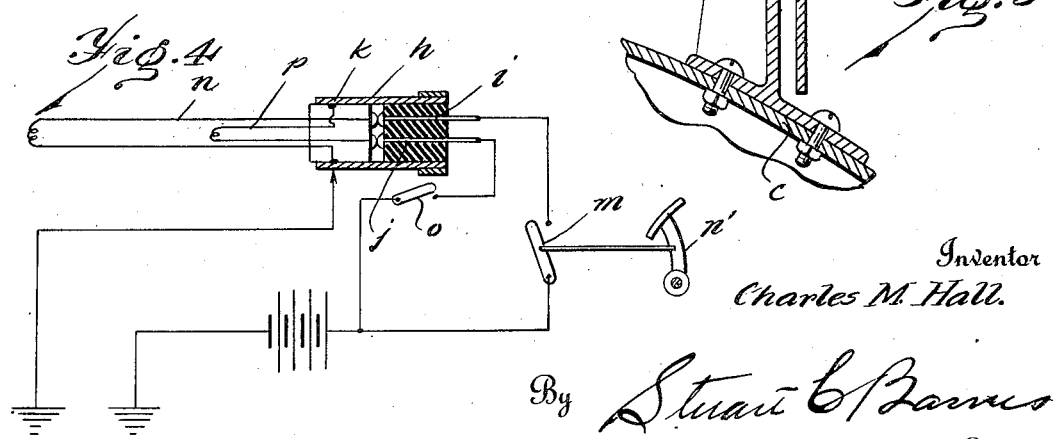
Inventor
Charles M. Hall.
By Stuart C. Barnes
Attorney Patented June 3, 1924.

1,496,218

UNITED STATES PATENT OFFICE.

CHARLES M. HALL, OF DETROIT, MICHIGAN.

VEHICLE LAMP.

Application filed February 6, 1922. Serial No. 534,396.

*To all whom it may concern:*

Be it known that I, CHARLES M. HALL, a citizen of the United States, residing at Detroit, in the county of Wayne and State of Michigan, have invented certain new and useful Improvements in Vehicle Lamps, of which the following is a specification.

This invention relates to signal and tail lights and especially to a combined tail and stop light.

Within the last year so-called stop or signal lights have come into quite general use. Almost all of them involve the use of another fixture and a separate light and electrical connections over and above the usual tail light supplied with the car. It is the object of the present invention to combine the ordinary tail light and a signal light in a single fixture and operate the same by the use of a single bulb. This makes a neater fixture for attachment to the car and results in a material manufacturing economy which is a very strong factor with manufacturers of automobiles. Furthermore, the arrangement is such that when the stop or signal light is used the ordinary tail light has its candle power very materially increased and hence the tail light co-operates with the legend on the signal light to arrest the attention of drivers behind. These and other features will appear in the description following.

In the drawings,—

Fig. 1 is a rear elevation of a motor car showing the signal and tail light in place.

Fig. 2 is a rear elevation of the combined signal and tail light.

Fig. 3 is a section taken on the line 3—3 of Fig. 2.

Fig. 4 is a diagrammatic view of the wiring.

The combined signal and tail light is embodied in a lamp casing or shell $a$ removably bolted to the stamped metal fixture or post $b$ which can be bolted through its base to the rear fender $c$. This lamp shell is preferably provided with a glass or other translucent plate $d$. One end of this glass is formed into a tail light lens $e$ colored with the usual red employed in the tail light. If a high grade lamp is required, ruby glass can be used for the entire plate. The lens, provided with the usual annular corrugation, serves as a suitable light-refracting or diffusing member. I have shown the translucent member that covers the opening in the lamp shell as a single plate but obviously it is not absolutely essential that a single plate be used for this purpose as the same could be divided into an ordinary tail light lens and a translucent member bearing the stop or other signal legend. The stop or signal legend is formed on the transparent plate by painting the remaining portion of the plate with a dark paint or enamel.

The lamp casing is divided by a partition wall $f$ into the signal light compartment and the tail light compartment. This partition wall is provided with an opening therethrough through which the incandescent light bulb $g$ may be passed. The tail light compartment is provided with a bulb socket $h$ secured to the wall of the compartment in any suitable manner. The bulb socket has separate terminals $i$ and $j$ for separate electric circuits. Each of these electric circuits has the shell of the socket $k$ as the other terminal of its circuit and the shell is in turn grounded. The terminal $i$ connects with the signal light switch $m$ which is preferably operated by a clutch or brake pedal $n'$ so as to be automatically worked. This terminal $i$ couples up with the large filament $n$ in the bulb when the bulb is in place. When the terminal $j$ is in circuit with the dash switch $o$ it couples up with the short or small filament $p$ when the bulb is in place. The small filament $p$ is contained wholly within the tail light compartment while the major portion of the large filament $n$ is contained within the signal light compartment.

Obviously when the brake or clutch pedal is operated to throw out the clutch or apply the brakes, the switch $m$ automatically closes the circuit through the terminal $i$ and the large filament $n$ becomes incandescent, throwing the rays of the larger candle power capacity of the bulb through the legend on the translucent plate. At the same time the tail light is lighted up by the same filament and serves as a further warning to arrest the driver behind. These rays can be further intensified by the use of a good reflector in both the stop light chamber and in the tail chamber or either. At night of course the tail light will be always on due to the dash light switch being turned and the small filament being incandescent. However, when the larger candle power filament is lighted up due to the automatic switch, the rays passing through the tail light are very largely intensified, serving as a warning to the driver behind and arresting his attention.

This arrangement is not only a manufacturing economy but it also does away with two separate fixtures for these two lights. Furthermore, a single bulb operating in the daytime to light both the tail light lens and the transparent legend plate and in the night-time to intensify the tail light lens and light the legend plate, realizes a distinct advantage in signal light construction. It permits the legend plate to have only the openings for the legend letters, thereby making these plainer on a darker back-ground than is the case where a warning red light is diffused all around the legend, as is a common construction in stop lights. The intensified red warning light is confined to the separate tail light lens where it is suitably diffused by the light-refracting properties of these lens and where it is more intense as it is concentrated in a single, large, spot.

The single lamp socket and the single lamp bulb, of course, is an economy over the use of two separate lamp sockets and bulbs. Furthermore, the wiring diagram of the car is slightly simplified by the use of a single socket in place of two sockets and two separate wirings.

No doubt this lamp will be used largely as a tail light and stop light but it is, of course, theoretically possible to use it on other parts of the vehicle. Hence it must be understood when the words "tail light" are used that this is used only as a term of description rather than a term of limitation.

What I claim is:

1. In a vehicle lamp, the combination of a lamp casing, a translucent plate covering the face of the casing, the said casing being divided into a signal light chamber and a tail light chamber, means for continuously lighting the tail light chamber, and additional means for lighting both chambers, the major portion of the last mentioned light giving means confined within the signal light chamber.

2. A vehicle lamp, having in combination, a lamp casing, translucent means covering the face of the lamp casing, said lamp casing being divided into separate compartments, one a tail light compartment and the other a signal light compartment, a socket, and a two-filament incandescent electric light bulb contained within both compartments so that one filament serves to light the tail light compartment and the other filament serves to light the signal light compartment.

3. A vehicle lamp, having in combination, a lamp casing provided with separate tail and signal light compartments divided by a partition wall having an opening therethrough, and translucent means for covering the face of the tail light compartment including a tail light lens and a translucent portion provided with a signal legend, a two-circuit light bulb socket located in the tail light compartment, and a two-filament bulb adapted to removably engage in said socket and adapted to be disposed through the partition wall opening, the said filaments arranged so that the smaller filament is included within the tail light compartment and the larger filament is included in both compartments.

4. A vehicle lamp, having in combination, a lamp casing, a translucent plate secured to the face of the lamp casing and including a tail light lens and a warning legend, a partition wall dividing the lamp casing into a tail light compartment behind the tail light lens, and a signal light compartment behind the signal legend, an incandescent light socket of two circuits contained within the tail light compartment, and a two-filament incandescent bulb to pass through the partition wall and having one filament contained wholly within the tail light compartment and the major portion of the other filament contained within the signal light compartment.

5. In a vehicle lamp, the combination of a lamp casing divided into two separate chambers, translucent means covering the face of the same, and a two-filament incandescent light contained in said two chambers and one filament located in one chamber while the major portion of the other filament is located in the other chamber so that one filament serves to light one chamber and a major portion of the other filament serves to light the other chamber.

6. In a vehicle lamp, the combination of a lamp casing divided into two separate chambers, translucent means covering the face of the same and provided with devices forming signs, and a two-filament incandescent light contained in said two chambers and one filament located in one chamber and the major portion of the other filament located in the other chamber so that one filament serves to light one chamber and the major portion of the other filament serves to light the other chamber.

In testimony whereof I affix my signature.

CHARLES M. HALL.